United States Patent
Kapaan et al.

(10) Patent No.: US 6,739,436 B1
(45) Date of Patent: May 25, 2004

(54) ACTUATOR COMPRISING A SLEEVE SUPPORT

(75) Inventors: Hendrikus Jan Kapaan, Nieuwegein (NL); Emmanuel Jacques Eyraud, Nieuwegein (NL); Alexander Jan Carel Vries, Tiel (NL); Jacobus Zwarts, Nieuwegein (NL); Lucia Puppione, Utrecht (NL)

(73) Assignee: SKF Engineering and Research Centre B.V., Nieuwegein (NL)

( * ) Notice: Subject to any disclaimer, the term of this patent is extended or adjusted under 35 U.S.C. 154(b) by 0 days.

(21) Appl. No.: 10/111,623
(22) PCT Filed: Nov. 3, 2000
(86) PCT No.: PCT/NL00/00798
§ 371 (c)(1), (2), (4) Date: May 16, 2002
(87) PCT Pub. No.: WO01/33098
PCT Pub. Date: May 10, 2001

(30) Foreign Application Priority Data

Nov. 4, 1999 (NL) .............................................. 1013489

(51) Int. Cl.⁷ .............................................. F16D 55/08
(52) U.S. Cl. ..................................... 188/72.8; 188/162
(58) Field of Search .............................. 188/71.9, 72.7, 188/72.8, 158, 161, 162; 74/424.71, 424.81, 89.23, 89.34; 310/80, 156.08, 156.12

(56) References Cited

U.S. PATENT DOCUMENTS 6,230,854 B1 * 5/2001 Schwarz et al. ............ 188/156
6,315,086 B1 * 11/2001 Schmitt et al. ............ 188/72.7
6,325,180 B1 * 12/2001 De Vries et al. ........... 188/72.1
6,367,597 B1 * 4/2002 De Vries et al. ......... 188/196 V

FOREIGN PATENT DOCUMENTS

| DE | 198 04 454 A1 | 5/1999 |
| WO | WO 99/21266 | 4/1999 |
| WO | WO 99/37010 | 7/1999 |

* cited by examiner

Primary Examiner—Jack Lavinder
Assistant Examiner—Bradley King
(74) Attorney, Agent, or Firm—Oliff & Berridge, PLC

(57) ABSTRACT

A screw actuator (4) comprises a housing (1), a nut (5) and a screw (6) one of which is axially fixed with respect to the housing and the other of which is axially displaceable with respect to the housing for moving an head (21), as well as a motor (7) which comprises a stator (8) connected to the housing, and a rotor (9) which is drivingly connected to a rotatable part (6) of the screw actuator, the housing having a bore (10) accommodating at least the nut and/or screw, an axially fixed part of said nut or screw being supported with respect to a radial support abutment (11) which extends inwardly in the bore. The rotor of the motor is supported rotatably on a sleeve (13), said sleeve engaging the fixed part and extending away from the brake pad, said sleeve having a radially outwardly extending sleeve flange (14) which is interposed between said support abutment, and the axially fixed part.

27 Claims, 1 Drawing Sheet

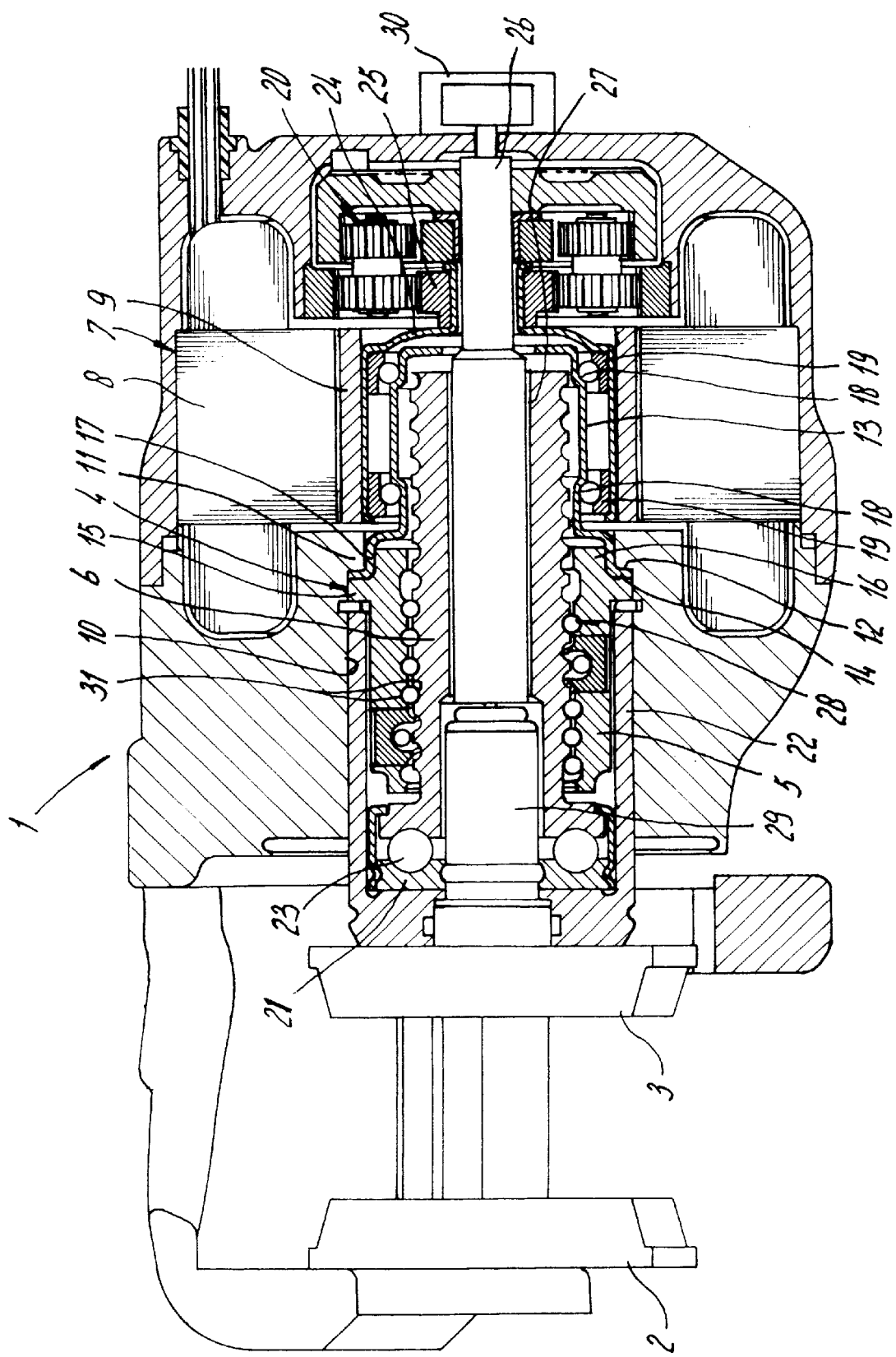

ACTUATOR COMPRISING A SLEEVE SUPPORT

BACKGROUND OF THE INVENTION

1. Field of Invention

The invention is related to an actuator, comprising a housing, a nut and a screw one of which is axially fixed with respect to the housing and the other of which is axially displaceable with respect to the housing for moving an actuating head, as well as an electric motor which comprises a stator connected to the housing, and a rotor which is drivingly connected to a rotatable part of the screw actuator, the housing having a bore accommodating at least the nut and/or screw, an axially fixed part of said nut or screw being supported with respect to a radial support abutment which extends inwardly in the bore.

2. Description of Related Art

Such actuator is known. The axially fixed part of the screw or nut is firmly pressed onto the radial support abutment as the actuating head is pressed outwardly against a member which is to be actuated. In this way, a simple and reliable support of the screw and nut in the housing is obtained.

SUMMARY OF THE INVENTION

The object of the invention is to further simplify the screw actuator construction, while maintaining the relatively simple and sturdy layout thereof. This object is achieved in that the rotor of the motor is supported rotatably on a sleeve, said sleeve engaging the fixed part and extending away from the actuator head, said sleeve having a radially outwardly extending sleeve flange which is interposed between said support abutment, and the axially fixed part.

In particular, the flange of the sleeve is supported on an abutment surface of the support abutment, which faces the actuating head connected to the axially displaceable nut or screw for exerting a compressive force.

The rotor sleeve is now held firmly clamped between the radial support abutment and the axially fixed part of the nut or screw, which provides a simple, reliable construction. No additional fastening means are necessary for supporting the rotor sleeve.

In a practical embodiment, the nut is fixedly supported within the housing, said nut having a radially outwardly extending nut flange facing the outwardly extending sleeve flange and overlapping the inwardly extending actuator support abutment.

In service of the screw actuator according to the invention, misalignment may occur as a result of eccentric forces and/or transverse forces. Such misalignment might cause damage to the balls and raceways of the nut and the screw, which are rather vulnerable to such loadings. According to the invention, this problem can be alleviated in case the outwardly facing surfaces of sleeve flange and the nut flange are curved in axial cross section, so as to allow swivelling or tilting of said nut and sleeve due to misalignment forces.

The screw/nut unit, as well as the drive unit including rotor and possible reduction means, may now move in unison so as to adapt to the misalignment.

A very stable embodiment is obtained in case the nut has a nut extension extending beyond the nut flange and inside the support abutment, the sleeve having an axially extending support part which is accommodated between said nut extension and the support abutment.

According to a preferred embodiment, the actuating head engages the screw through a rolling element bearing. Said rolling element bearing is integrated with the actuating head. A further improvement concerning stability is obtained in case the actuating head is accommodated in a cylinder, which is held non-rotatably in the bore.

The sleeve may comprise a sheet metal part which is provided with the inner raceway of at least one support bearing for rotatably supporting the rotor; alternatively, a separate bearing may be mounted with its inner ring on said sleeve.

For ease of handling and assembly, the sleeve and the nut are clampingly pre-assembled.

The sleeve may furthermore comprise an inwardly extending flange at its end opposite the sleeve flange, which flange carries a gear wheel of the gear reduction mechanism.

The invention is also related to a brake calliper for a disc brake, comprising a claw piece which carries at least two brake pads which enclose a gap for accommodating a brake disc, an actuator comprising a nut and a screw one of which is axially fixed with respect to the claw piece and the other of which is axially displaceable with respect to the claw piece for moving the brake pads towards and from each other, as well as an electric motor which comprises a stator connected to the claw piece, and a rotor which is drivingly connected to a rotatable part of the screw actuator, the claw piece having a bore accommodating at least a part of the screw actuator, an axially fixed part of the screw actuator being supported with respect to a radial support abutment which extends inwardly in the bore.

According to the invention, the rotor of the motor is supported rotatably on a sleeve, said sleeve engaging the fixed part of the screw actuator and extending away from the brake pads said sleeve having a radially outwardly extending sleeve flange which is interposed between said support abutment, and the axially fixed part of the screw actuator.

DESCRIPTION OF THE DRAWINGS AND DETAILED DESCRIPTION

The invention will now be described further with reference to an embodiment shown in the FIGURE which shows a cross section.

The FIGURE shows a brake calliper 1, comprising a screw actuator having a nut 5, which by means of balls 28 rotatably supports a screw 6. The nut 5 and screw 6 have appropriately shaped screw type grooves 31.

The electric motor 7 has a stator 8 connected to the housing 1, as well as a rotor 9 which through bearings 19 is rotatably supported on a sleeve 13. That sleeve 13 comprises a raceway 18 for the bearings 19. In the alternative, the sleeve may of course carry the inner rings of separate bearings.

Said rotor sleeve 9 has an outwardly extending sleeve flange, which is held between a radially inwardly extending support abutment 11 of the housing 1, as well as an outwardly extending nut flange 15.

Said outwardly extending nut flange 15, as well as the sleeve flange 14 are sitting within the bore 10 in the housing 1. The support abutment 11 extends radially inwardly with respect to the wall of the bore 10.

Non-rotatably held within the bore 10 is a cylinder 25, within which an actuating head 29 is accommodated. Through ball bearing 23, that actuating head engages the screw 6 of the screw actuator 4.

By actuating the motor 7, the rotor 9 drives the screw 6 of the screw actuator 4, via the shaft 26. Said shaft 26 is connected on the one hand to the reduction gear mechanism 20 which is driven by the rotor 9 through the sleeve 13 and the inwardly extending flange 24 thereof.

On the other hand, central drive shaft 26 extend into a bore 27 of the screw 6, which shaft 26 is non-rotatably coupled to the screw 6 through a spline/groove mechanism.

As a result, the screw 6 is rotated and moved outwardly, so as to bring the brake pad 3 closer to brake pad 2 for exerting a braking effect on a brake disk (not shown).

As a result of the compressive forces thereby exerted on the nut 5, the support sleeve 13 is held firmly clamped against the support abutment 11 of the housing 1.

With the aim of accommodating misalignments, which might cause harm to the raceways and balls of the screw actuator, the sleeve flange 14 as well as the nut flange 15 may be curved preferably along the surface of an imaginary sphere, so as to allow some adaptation of the screw actuator 4 together with the rotor 9 and reduction 5 mechanism 20.

The screw 6 can be driven by means of an auxiliary drive, e.g. a hand brake drive 30, connected to drive shaft 26.

What is claimed is:

1. Screw actuator, comprising a housing, a nut and a screw one of which is axially fixed with respect to the housing and the other of which is axially displaceable with respect to the housing for moving an actuating head, as well as a motor which comprises a stator connected to the housing, and a rotor which is drivingly connected to a rotatable part of the screw actuator, the housing having a bore accommodating at least one of the nut and the screw, an axially fixed part of said at least one of the nut and the screw being supported with respect to a support abutment which extends inwardly in the bore, characterised in that the rotor of the motor is supported rotatably on a sleeve, said sleeve engaging the axially fixed part and extending away from the actuating head, said sleeve having a radially outwardly extending sleeve flange which is interposed between said support abutment, and the axially fixed part.

2. Actuator according to claim 1, wherein the sleeve flange of the sleeve is supported on an abutment surface of the support abutment which faces the actuating head connected to the axially displaceable nut or screw for exerting a compressive force.

3. Actuator according to claim 1, wherein the nut is fixedly supported within the housing, said nut having a radially outwardly extending nut flange facing the outwardly extending sleeve flange and overlapping the inwardly extending support abutment.

4. Actuator according to claim 3, wherein the outwardly facing surfaces of sleeve flange and the nut flange are curved in axial cross section, so as to allow swivelling or tilting of said nut and sleeve due to misalignment forces.

5. Actuator according to claim 3, wherein the nut has a nut extension extending beyond the nut flange and inside the support abutment, the sleeve having an axially extending support part which is accommodated between said nut extension and the support abutment.

6. Actuator according to claim 2, wherein the actuating head engages the screw through a rolling element bearing.

7. Actuator according to claim 6, wherein the rolling element bearing is integrated with the actuating head.

8. Actuator according to claim 7, wherein the bearing is a ball bearing.

9. Actuator according to claim 2, wherein the actuating head is accommodated in a cylinder which is held non-rotatably in the bore.

10. Actuator according to claim 3, wherein the sleeve comprises a sheet metal part which is provided with an inner raceway of at least one support bearing for rotatably supporting the rotor.

11. Actuator according to claim 3, wherein at least one rolling element bearing is mounted on the sleeve.

12. Actuator according to claim 10, wherein the support part of the sleeve has a diameter which is larger than a raceway diameter of said sleeve.

13. Actuator according to claim 10, wherein the sleeve is firmly clamped to the nut.

14. Actuator according to claim 1, wherein the rotor engages the screw through a gear reduction mechanism.

15. Actuator according to claim 14, wherein a rotor sleeve comprises an inwardly extending flange at its end opposite the sleeve flange, which flange carries a gear wheel of the gear reduction mechanism.

16. Actuator according to claim 15, wherein the gear reduction mechanism is connected to a central drive shaft which is rotatably supported in the housing and which extends into a bore in the screw, said drive shaft being non-rotatably coupled to the screw through a spline/groove mechanism.

17. Actuator according to claim 16, wherein a lubricant dosing module is accommodated in the bore of the screw.

18. Brake calliper for a disc brake, comprising a claw piece which carries at least two brake pads which enclose a gap for accommodating a brake disc, an actuator according to claim 1, comprising a nut and a screw one of which is axially fixed with respect to the claw piece and the other of which is axially displaceable with respect to the claw piece for moving the brake pads towards and from each other, as well as an electric motor which comprises a stator connected to the claw piece, and a rotor which is drivingly connected to a rotatable part of the screw actuator, the claw piece having a bore accommodating at least a part of the screw actuator, an axially fixed part of the screw actuator being supported with respect to a radial support abutment which extends inwardly in the bore, characterised in that the rotor of the motor is supported rotatably on a sleeve, said sleeve engaging the fixed part of the screw actuator and extending away from the brake pads said sleeve having a radially outwardly extending sleeve flange which is interposed between said support abutment, and the axially fixed part of the screw actuator.

19. Brake calliper according to claim 18, wherein a flange of the sleeve is supported on an abutment surface of the support abutment which faces the brake pads.

20. Brake calliper according to claim 18, wherein the nut is fixedly supported, said nut having a radially outwardly extending nut flange facing the outwardly extending sleeve flange and overlapping the inwardly extending brake calliper support abutment.

21. Brake calliper according to claim 20, wherein the outwardly facing surfaces of sleeve flange and the nut flange are curved in axial cross section, so as to allow swivelling or tilting of said nut and sleeve due to misalignment forces.

22. Brake calliper according to claim 20, wherein the nut has a nut extension extending beyond the nut flange and inside the support abutment, the sleeve having an axially extending support part which is accommodated between said nut extension and the support abutment.

23. Brake calliper according to claim 20, wherein the sleeve comprises a sheet metal part which is provided with inner raceways of a set of support bearings for rotatably supporting the rotor.

24. Brake calliper according to claim 22, wherein the support part of the sleeve has a diameter which is larger than a raceway diameter of said sleeve.

25. Brake calliper according to claim 18, wherein the rotor engages the screw through a gear reduction mechanism.

26. Brake calliper according to claim 18, wherein the screw is connected to an auxiliary drive.

27. Brake calliper according to claim 26, wherein the auxiliary drive is a hand-brake drive.

\* \* \* \* \*